United States Patent [19]
Blank

[11] Patent Number: 6,161,870
[45] Date of Patent: *Dec. 19, 2000

[54] CARD WITH REMOVABLE, REUSABLE ELEMENT

[75] Inventor: Eric Blank, Sudbury, Mass.

[73] Assignee: Arthur Blank & Co., Inc., Boston, Mass.

[*] Notice: This patent is subject to a terminal disclaimer.

[21] Appl. No.: 09/425,317

[22] Filed: Oct. 21, 1999

Related U.S. Application Data

[63] Continuation of application No. 08/671,714, Jun. 28, 1996, Pat. No. 5,997,042, which is a continuation of application No. 08/411,382, Mar. 28, 1995, Pat. No. 5,531,482, which is a continuation of application No. 08/119,871, Sep. 10, 1993, abandoned.

[51] Int. Cl.$^7$ ..................................................... B42D 15/00
[52] U.S. Cl. .................................. 283/75; 40/299; 281/2; 283/81; 283/904
[58] Field of Search .................................. 283/61, 51, 70, 283/75, 81, 904, 101; 281/2, 5; 40/299, 630, 638; 156/249, 344, 230; 428/42.1, 42.3, 43; 462/5, 6, 2

[56] References Cited

U.S. PATENT DOCUMENTS

| | | |
|---|---|---|
| Re. 31,211 | 4/1983 | Whitehead . |
| 2,434,545 | 1/1948 | Brady, Jr. et al. . |
| 2,831,277 | 4/1958 | Strachan . |
| 3,038,597 | 6/1962 | Brady, Jr. . |
| 3,226,862 | 1/1966 | Gabruk . |
| 3,568,829 | 3/1971 | Brady, Jr. . |
| 3,583,317 | 6/1971 | Gibson . |
| 3,622,995 | 11/1971 | Dilks et al. . |
| 3,632,995 | 1/1972 | Wilson . |
| 3,808,718 | 5/1974 | Christiansen . |
| 3,822,492 | 7/1974 | Crawley . |
| 3,896,246 | 7/1975 | Brady, Jr. . |
| 3,914,483 | 10/1975 | Stipek, Jr. . |
| 3,965,598 | 6/1976 | Avery . |

(List continued on next page.)

FOREIGN PATENT DOCUMENTS

| | | |
|---|---|---|
| 0570317A1 | 11/1993 | European Pat. Off. . |
| 2566564 | 12/1985 | France . |
| 6048072 | 2/1994 | Japan . |
| 2143204A | 2/1985 | United Kingdom . |

*Primary Examiner*—A. L. Wellington
*Assistant Examiner*—Monica S. Carter
*Attorney, Agent, or Firm*—Wolf, Greenfied & Sacks, P.C.

[57] ABSTRACT

A transactional control system, a promotional system, and a redemption system including a set of a card and a removable and reusable label. The removable and reusable label having a first side printed with indicia thereon, and a second side coated with a reusable adhesive layer suitable for affixing the label to either a first or a second planar side of the card. The label, printed with a registration indicia thereon, can be removed from the transaction card without leaving residue on the card and can be affixed to a registration form for registration of a holder of the transaction card. Alternatively, the label printed with a redeemable coupon indicia thereon, can be removed from a promotion card and affixed to a transaction receipt for associating a particular transaction with the redeemable coupon. In another embodiment the label is printed and scored to form individually removable segments which can be removed from the redemption card and redeemed.

19 Claims, 3 Drawing Sheets

U.S. PATENT DOCUMENTS

| | | |
|---|---|---|
| 4,060,168 | 11/1977 | Romagnoli . |
| 4,066,873 | 1/1978 | Schatz . |
| 4,126,333 | 11/1978 | Dickinson . |
| 4,272,327 | 6/1981 | Logan . |
| 4,359,633 | 11/1982 | Bianco . |
| 4,372,681 | 2/1983 | Sallenbach . |
| 4,379,573 | 4/1983 | Lomeli et al. . |
| 4,544,590 | 10/1985 | Egan . |
| 4,620,727 | 11/1986 | Stockburger et al. . |
| 4,627,643 | 12/1986 | Leonetti et al. . |
| 4,643,455 | 2/1987 | North et al. . |
| 4,682,692 | 7/1987 | Kessler . |
| 4,724,166 | 2/1988 | deBruin . |
| 4,778,153 | 10/1988 | Bachman et al. . |
| 4,815,768 | 3/1989 | Applebaum et al. . |
| 4,839,507 | 6/1989 | May . |
| 4,854,610 | 8/1989 | Kwiatek . |
| 4,872,707 | 10/1989 | deBruin . |
| 4,944,532 | 7/1990 | Pollard . |
| 4,958,066 | 9/1990 | Hedgcoth . |
| 4,972,476 | 11/1990 | Nathans . |
| 4,978,146 | 12/1990 | Warther et al. . |
| 5,002,313 | 3/1991 | Salvatore . |
| 5,019,697 | 5/1991 | Postman . |
| 5,067,713 | 11/1991 | Soules et al. . |
| 5,131,516 | 7/1992 | Clough . |
| 5,173,081 | 12/1992 | Greig . |
| 5,282,649 | 2/1994 | Williams et al. . |
| 5,299,834 | 4/1994 | Kraige . |
| 5,308,120 | 5/1994 | Thompson . |
| 5,438,928 | 8/1995 | Chatwin . |
| 5,501,491 | 3/1996 | Thompson ............ 283/70 |
| 5,514,860 | 5/1996 | Berson . |
| 5,522,623 | 6/1996 | Soules et al. . |
| 5,531,482 | 7/1996 | Blank . |
| 5,997,042 | 12/1999 | Blank . |

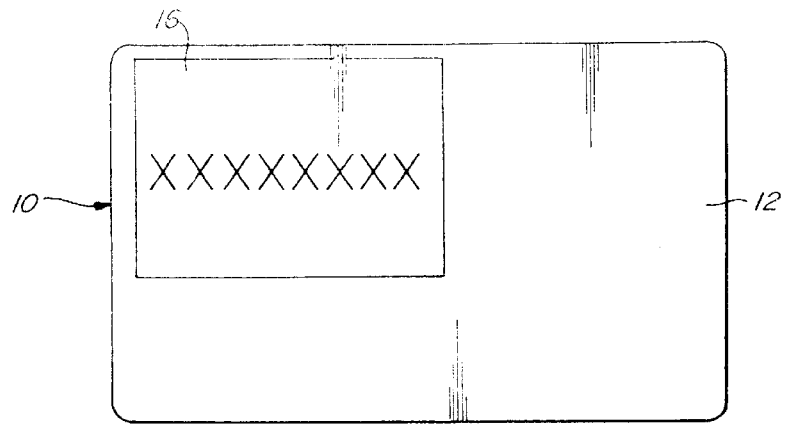
Fig. 1a
Fig. 1b
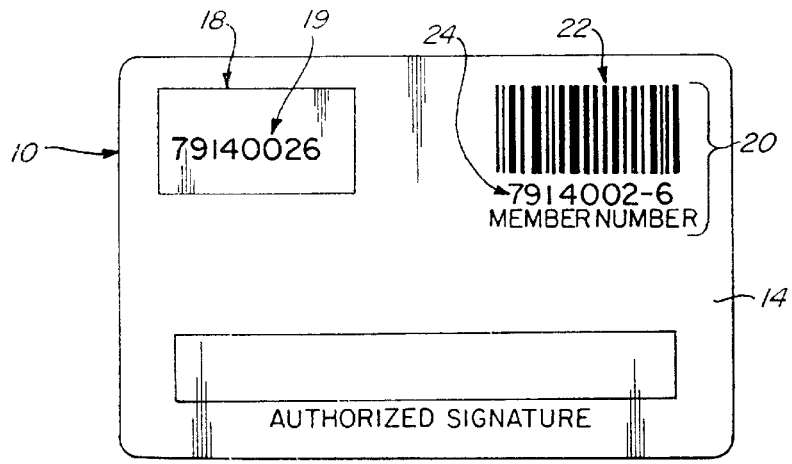
Fig. 2

CARD WITH REMOVABLE, REUSABLE ELEMENT

This application is a continuation of application Ser. No. 08/671,714, filed Jun. 28, 1996, now U.S. Pat. No. 5,997,042 entitled CARD WITH REMOVABLE, REUSABLE ELEMENT, now pending, which is a continuation of application Ser. No. 08/411,382, filed Mar. 28, 1995, now U.S. Pat. No. 5,531,482, issued Jul. 2, 1996, which is a file wrapper continuation of application Ser. No. 08/119,871, filed Sep. 10, 1993, now abandoned.

FIELD OF THE INVENTION

This invention relates to a transactional control system and, in particular, to the combination of a transaction card and a label which is affixed to the transaction card via a reusable adhesive, wherein the label can be removed from the transaction card and reused without leaving a residue or sticky surface on the transaction card.

BACKGROUND OF THE INVENTION

A substantial market has developed in recent years for inexpensively manufactured, individually encoded, transaction cards for uses such as credit and debit cards, membership cards, promotional cards (i.e. frequent flyer cards), I.D. cards, and the like. Such transaction cards commonly bear a registration code in a bar code format to permit automatic machine scanning of the card, an alphanumeric code, or both. Such cards may be supplied as a set with one or more labels adjoining the card and bearing the same individual code number as the card. The labels are adapted for attachment to application forms, membership lists and the like.

One problem with the above system is that the manufacturing process to provide such sets takes many steps. For example, one process known in the art is a multiple step process in which individual sheets of uniquely encoded transaction cards, and labels with the same unique codes as the cards, are printed separately. Subsequently the labels with appropriate codes are attached to each sheet adjoining the like-coded cards. Thus, the process requires several labor intensive steps including identifying the appropriate label, applying the label to the sheet to properly adjoin the associated card, and checking the final product for accuracy. In addition, because the transaction card and labels must be printed separately, if the same printer is used to print the transaction card and the labels, more printing time is required. Alternatively, several printers must be used to simultaneously print the cards and labels.

Still another manufacturing process known in the art is attaching the card and label to the application form prior to printing of the card or the label, thus requiring the carrier with the card and label attached to be passed through a printer to provide the set of the carrier, the card and the label. A problem with this method of manufacturing is that an additional printing step is required after the card and label have been attached to the pre-printed application form. In addition, there are additional costs associated with attaching the label and card to the application form.

Warther et al. (U.S. Pat. No. 4,978,146) disclosed a sheet including a plurality of sets of code fields printed on a first planar side of the sheet, each set of code fields being printed with a numeric code unique to the set. A first field is printed in at least a bar code format, and a second field is printed in at least a numeral format and is spaced from the first code field on the first planar side of the sheet. A layer of adhesive is applied to at least part of a second planar side of the sheet opposite the second code fields printed on the first side of the sheet. The sheet is scored to define a plurality of sets of elements removable from the sheet, including a first element bearing the first code field and a second element bearing the second code field. The first element of each set of removable element is generally a transaction card sized element bearing a static graphic field on at least one of the planar sides of the sheet and the first code field. The second element of each set bears the second code field of each set on the first planar side of the element and a pressure sensitive adhesive along the second planar side of the sheet.

A problem with the system disclosed by Warther et al. is the thickness of the transaction card element and the second element with the peel-off double stick adhesive backing, in that both elements are extremely heavy. In addition, the product is cumbersome to use in that the elements must be separated from the sheet product and the double stick adhesive backing must be peeled away from the second element of the set and attached to the proper form. Further, because there exist a number of sets of transaction cards and second elements per sheet, there is still a question of guaranteed number match between the transaction card and the second element which requires the code of the second element to be checked for the same number as a transaction card before attachment to the form.

Kwiatek (U.S. Pat. No. 4,854,610) disclosed a continuous sheet substrate including a series of consecutive panels that are separable from one another along a horizontal score line positioned between the panels. Each of the panels includes a laminated area covering a minor portion of the panel, each laminated area including a layer of release coating material adhered to a portion of the panel, a layer of pressure sensitive adhesive material adhered to a portion of the layer of release coating material, and a thin laminated sheet component adhered to the pressure sensitive adhesive layer and held to the panel by the pressure sensitive adhesive. The panel is also provided with score lines to allow the thin laminated sheet component, the pressure sensitive adhesive layer, the release coating layer and the minor portion of the panel to be removed from the remainder of panel as an integral laminate unit, wherein the minor portion of the panel functions as a releasable liner for the laminate unit. The releasable liner, when removed, exposes the pressure sensitive adhesive attached to the thin laminated sheet component, allowing adhesion of the thin laminated sheet component to another object.

The sheet substrate can be an imprinted business form and the laminated sheet component can be a card. However, a problem with this system of providing a set of a business form and a laminated card is that there is no label for attachment to the business form. Thus, completion of a registration form requires manually writing the serial number on the card to the appropriate space on the business form. Additional problems with the above system are that the manufacturing process includes the cost of an additional printing step of printing the card and form with the card attached, the cost of mounting the thin laminated card to the sheet substrate, and additional processing costs associated with processing the sheet substrate. In addition, the card attached to the sheet product is only a thin temporary card.

A problem with registering a holder of a transaction card and label set produced by any of the above prior art systems is that registration is a cumbersome process. Normally, the registrant must go to the store offering the transaction card, fill out the application form and either manually write in the identification number on the card or separate a label from a set of cards and labels and peel off a release layer to expose an adhesive backing and affix the label to the form. In addition, with these systems there is still a possibility of error in not matching the number on the form to the number on the card.

An alternative to the above-identified transaction card systems is a normal credit card issuing system, wherein a pre-approved application form is transmitted to a targeted group of the population. A person receiving the pre-approved registration form must complete the registration form and return it to the promoter. Thus, registration of a holder of the credit card is a multi-step and a lengthy process. For example, after mailing the pre-approved registration form, the potential card holder must wait for a confirmation letter and the credit card to mailed by the promoter. Also, the process is wasteful in that only a small percentage of the pre-approved registration forms are returned, the rest being discarded.

It has also been the practice in recent years to provide redeemable coupons via mass mailing or news carrier services. The purpose of these redeemable coupons is typically to promote a product and increase sales. The coupons are typically clipped by the targeted population and returned to the promoter for redemption. A problem with this method of offering discounts to potential customers is that the promoter, upon receiving the redeemed coupon, has no way of matching up each sale to the coupon which has been redeemed. For example, the promoter typically places the coupon in a cash drawer and reduces the price of the goods by the coupon value. In addition, the promoter may have a discrepancy between the cash collected and the number of transactions recorded resulting from difficulties in accounting for the coupons redeemed.

There has also developed a market for redemption cards, printed with static graphic field on a first planar side of the redemption card and with a plurality of numbers on a second planar side of the redemption card. The redemption card is used as a redemption item where the numbers on the second planar side of the credit card are removed each time a selected restaurant or establishment is visited, or a discount is given by the promoter of the card, and the like. The numbers are typically removed either by scratching off the number, erasing the number with an acetate pen, or by punching a hole through the number and the card. A problem with such prior art cards is that a utensil is needed to implement eliminating the number from the back of the card. In addition, some of the methods promote destruction of the card.

Accordingly, the present invention is directed to solving the problem of the lengthy and multiple step process associated with registration of holders of cards provided by the prior art systems by providing a method and apparatus for instantly registering a holder of such cards.

In addition, the present invention is directed to solving the problem of the costs of producing the multiple element sets of cards, labels and application forms by providing a method of reducing the number of steps and the costs associated with producing the set.

Further, the present invention is directed to solving the problem of collecting redeemed coupons and associating the redeemed coupon with a particular sale by providing a method and apparatus for making such association.

In addition, the present invention is directed to solving the problem associated with removing numbers from the prior art redemption cards with the numbers printed on a back side thereof by providing a method and apparatus for easily removing the numbers.

SUMMARY OF THE INVENTION

In one aspect, the invention is directed to a transactional control system including a transaction card and a removable and reusable label having a first side suitable for printing with indicia thereon and a second side having a reusable adhesive layer suitable for affixing the label to the transaction card. The label printed with registration indicia may be removed from the transaction card without leaving residue on the card and may be affixed to a registration form for instant on-site registration of a holder of the card. Alternatively, a label printed with a redeemable coupon indicia may be removed from the transaction card and affixed to a transaction receipt for associating a particular transaction with a particular redeemable coupon.

Accordingly, a holder of a transaction card and label set may be instantly registered by providing the holder with the transaction card, the label which is printed with registration indicia affixed to such transaction card, and a form suitable for receiving the label, removing the label from the transaction card and affixing the label to the form.

In addition, a record of a coupon used by a purchaser of goods or services may be kept, and association of the coupon with a particular sale may be accomplished by providing the purchaser with a promotion card and a label printed with a redeemable coupon affixed to the promotion card, removing the label from the promotion card, and affixing the label to a copy of a receipt.

In another aspect, the invention is directed to a redemption card system including a redemption card having two opposing planar sides and a removable label affixed to either planar side of the redemption card. The label has two planar sides, a first sided printed and scored to form individually removable labels and a second side with adhesive layer thereon for affixing the label to the redemption card. Accordingly, the individually removable labels can be removed for redemption.

BRIEF DESCRIPTION OF THE INVENTION

The foregoing and other objects and advantages of the invention will become apparent with reference to the following detailed description of the preferred embodiments as illustrated by the drawings in which:

FIG. 1a depicts a first major planar side of a transaction card suitable for use as a registration vehicle according to this invention;

FIG. 1b depicts a second major planar side of a transaction card suitable for use as a registration vehicle according to this invention;

FIG. 2 depicts a promotion card and label assemble transaction card of FIGS. 1a and 1b;

DETAILED DESCRIPTION OF PREFERRED EMBODIMENTS

Figure 3:
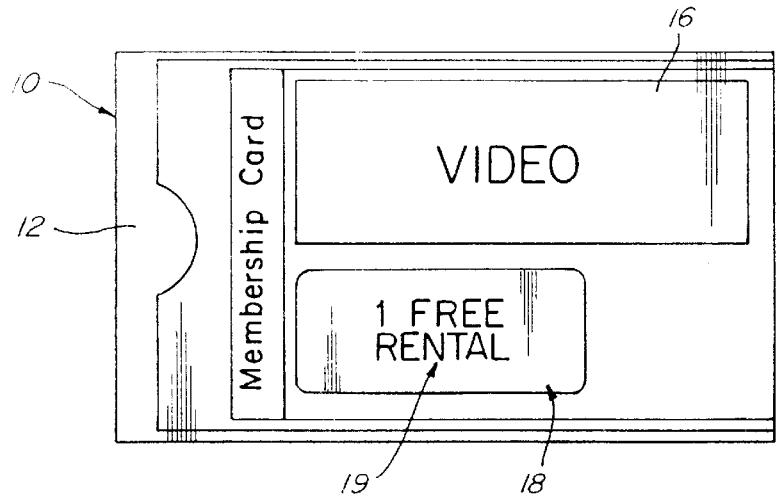
FIG. 3 depicts a promotion card and label assembly suitable for use as a promotional vehicle according to this invention.

FIGS. 1, 3, 4 and 6 depict a card product of the present invention indicated generally at 10. The card has two major planar opposing sides 12 and 14. As will be described below, planar sides 12 and 14 form the imprinted sides of the card 10. Either of the sides of the card may be printed with static promotional graphic fields or personalized graphic fields.

Either planar side of the card can be supplied with at least one label 18 affixed to the card, wherein the label has two major planar sides, a first side suitable for printing with indicia thereon and a second side coated with an adhesive layer suitable for affixing to the card and for removal from the card without leaving a residue on the card. The label 18 can be made of paper, plastic or other material.

FIGS. 1a and 1b illustrate, respectively, the first and second major planar sides of a transaction card suitable for use as a registration vehicle according to a specific embodiment of the present invention. In FIG. 1a, there is printed on the first planar side 12 of the transaction card 10, an identification field 16. The depicted identification field is used to identify a promoter offering such card. Letters, numbers, and other symbols are suitable for use in identifying the promoter. In addition, either planar side of the card may be printed with static graphic fields or personalized.

FIG. 1b illustrates the second major planar side of the transaction card according to the present invention. In FIG. 1b there is printed on the second planar side 14 a registration field 20. The registration field 20 includes an alphanumeric registration number 24 and a bar code number 22 for automatic scanning of the registration field. However, it is contemplated by the present invention that the registration field may comprise alphanumeric numbers, a bar code, letters, symbols, and the like, and that the registration field may be printed on either planar side of the transaction card or both. In the depicted registration field the registration number has eight digits. However, more or fewer digits and letters and other symbols are contemplated according to the present invention; although it is appreciated that letters and other symbols will not appear in the bar code format representation. Also, the registration codes printed on additional transaction cards need not be numerically sequential, merely different.

In FIG. 1b there is also provided a removable and reusable label 18 affixed to the second side 14 of the transaction card 10. However, it is contemplated by the present invention that the label can be affixed to either planar side of the transaction card, or multiple labels can be affixed to either or both sides of the card. The removable and reusable label includes two major planar opposing sides. In FIG. 1b a first side of the removable and reusable label is printed with registration indicia corresponding to that printed in the registration field of the transaction card. However, it is also contemplated by the present invention that the label may be printed with indicia which is visibly different than that printed in the registration field of the transaction card. For example, either the card or label may include bar codes, alphanumeric numbers, letters, symbols, check digits and the like. The second side of the label is coated with a reusable adhesive and affixed to the card and may be removed without leaving residue on the card.

As described above, the prior art method of manufacturing a set of transaction cards and associated labels is a multi-step, labor intensive, and expensive process. In accordance with the present invention, the number of steps and the cost of manufacturing can be significantly reduced. For example, prior to printing, the label or labels can be affixed to either planar side of the transaction card and thereafter the labels and transaction card can be printed with registration indicia, and personalized graphic fields by a single printer. In a specific embodiment of the invention printing of the labels and cards is accomplished in sequence (i.e. in a single pass). In addition, it is contemplated by the present invention that the label and card can either be pre-printed with static information prior to the printing step or personalized at the same time as the printing step. Accordingly, it is an advantage of the present invention that the transaction card and associated label sets can be manufactured and printed in a minimum of non-labor intensive steps since no matching of registration indicia on the label to that on the transaction card is required. For example in FIG. 4b, there is illustrated a second coupon label 18 attached to the second planar side of the promotional card. In addition, it is an additional advantage that the card need not be mounted on a sheet of paper and thus the cost of the paper and of mounting the card on the sheet is eliminated.

FIG. 2 illustrates a registration form 26 suitable for use with the transaction card and label set of FIGS. 1a and 1b, according to the present invention. In FIG. 2, the registration form 26 includes an information field 30 to be completed by a holder of the transaction card and label set. In addition, registration form 26 includes a registration label receiving field 28 suitable for affixing the label 18 printed with the registration indicia 19 thereon. FIG. 2 is a simplified version of a registration form and other registration forms comprising registration label receiving fields and information fields are also contemplated by the present invention.

As described above, a problem with the prior art method of registering holders of transaction cards is that registration is a lengthy and a multi-step process. Accordingly, the present invention is directed to a method and an apparatus for instantly associating a registration indicia with a registration form. The registration form, without registration indicia, transaction card, or the label assembly, can be supplied to a prospective customer via targeted mailing, news services, and the like or handed to a prospective customer at the store. The prospective customer can effect instant registration at the registration site by handing the completed form to a clerk at the offering store. The clerk may then select a card and label set, remove the removable and reusable label from the transaction card, affix the label to the registration form, and hand the card to the customer. Thus, instant on-site registration of a prospective customer is effected and the registration form with label attached can be sent to a home office for entry into a database, or entered into the database on-site at the end of a business day. Therefore, it is an additional advantage of the present invention that the number of steps, the time for registration and the possibility of error associated with registration of a prospective customer, are significantly reduced.

As discussed above, the prior art method of registering a prospective holder of a credit card is a lengthy multi-step process. However, in accordance with a specific embodiment of the present invention, the number of steps and the length of the registration process of a prospective credit card customer can be significantly reduced. For example, a credit card with the removable and reusable label affixed to either side of the credit card and printed with a registration indicia thereon, and a registration form may be transmitted to targeted groups of the population. A potential registrant may then fill out the application form at home, remove the label from the credit card, place the label on the application form, and mail the form to the promoter of the card for instant registration.

Figure 4A:
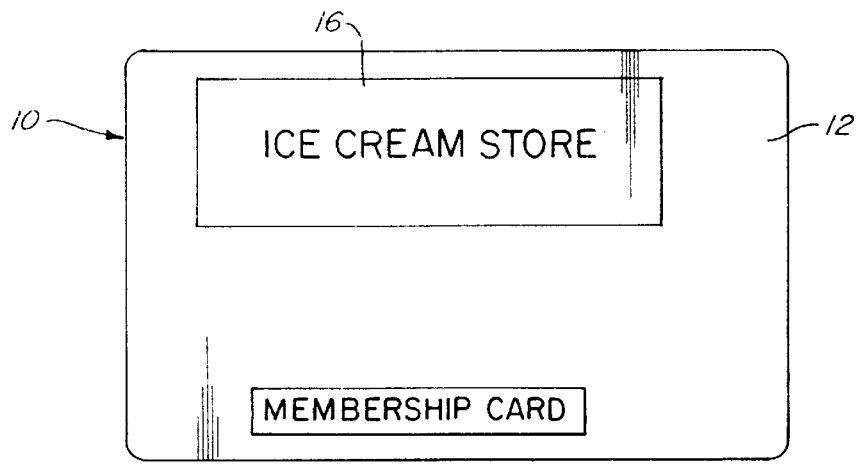
FIG. 4a depicts a first planar side of a promotion card suitable for use as a promotion vehicle according to this invention.
Figure 4B:
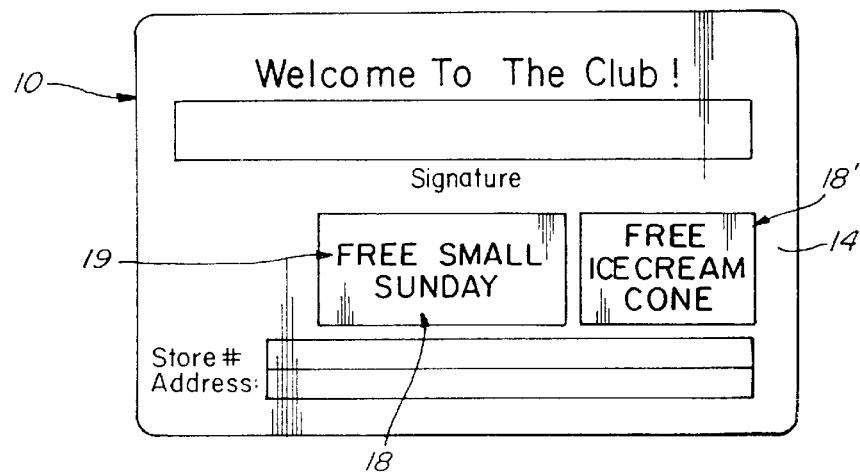
FIG. 4b depicts a second planar side of a promotion card suitable for use as a promotion vehicle according to this invention.

Referring to FIGS. 3 and 4a–4b, there is illustrated a promotional card and label set suitable for use as a promotional vehicle. In FIG. 3, the label 18 is printed with indicia 19 representative of a redeemable coupon. In FIG. 3, the redeemable coupon label 18 affixed to the first planar side 12 of the transaction card 10. Alternatively, referring to FIG. 4b, the redeemable coupon label 18 can be affixed to the second major planar side 14 of the transaction card 10. Although it is shown that the redeemable coupon is affixed to either side of the promotional card, it is contemplated by the present invention that a number of such coupon labels may be used and affixed to either or both sides of the promotional card. For example in FIG. 4b, there is illustrated a second coupon label 18' attached to the second planar side of the promotional card. Examples of promotional uses for which the promotional card and label set can be used include frequent flyer membership cards and associated promotions, video membership cards and associated promotions, preferred customer cards and associated promotions, credit cards and associated promotions, and the like. In addition, the removable and reusable label can also be used as an enhancement to existing transactional or promotional cards by affixing a coupon label to a card for later redemption. Therefore, the promotional card and coupon set can be supplied to potential customers to replace existing separately issued coupons which are sent to customers, for example as is seen in the airline industry with frequency flyer upgrades, car rental discounts, hotel upgrade coupons, and the like. Therefore, an additional advantage of the present invention is that the costs associated with printing and mailing separate coupons is eliminated.

The promotional card and label set embodiments illustrated in FIGS. 3 and 4a–4b can also be used to associate the coupon label with a particular transaction. In particular, the card and label affixed to the card, can be provided to a potential customer or the label can be affixed to an existing card of a current holder for redemption. A holder of such card can present the card, at the time of purchase, wherein the label can be removed from the card and affixed to a copy of a receipt of the transaction.

Figure 5:
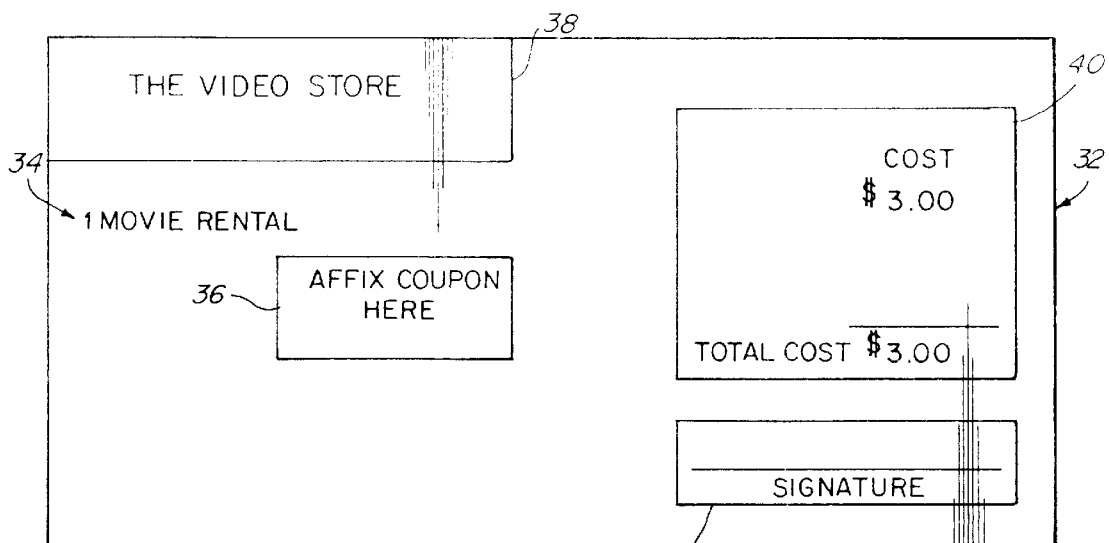
FIG. 5 depicts a merchant receipt suitable for use with the promotional vehicles of FIGS. 4 and 5.

FIG. 5 illustrates a receipt form 32 suitable for use with the promotional card and label set of FIG. 3 and 4, according to the present invention. In FIG. 5, the receipt form 30 includes a description field 34 for describing the items purchased by a holder of the promotional card. In addition, receipt form 32 includes a coupon label receiving field 36 suitable for affixing the coupon label 18 printed with the coupon indicia 19 to the receipt form 32. In addition, receipt form 32 may include a graphic field 38 for printing with the store's logo, title, and the like; a purchase price field 40 for summarizing the individual price of each item purchased and the total purchase price; and a signature field for a signature of the customer. Although FIG. 5 is a simplified version of a receipt form 32, other receipt forms comprising at least description fields and coupon label receiving fields are also contemplated by the present invention.

Accordingly, an advantage of the present invention is that the invention can be used to associate a coupon with a particular transaction. In addition, the promoter will have a record of cash collected and the discount given as a result of redemption of the coupon. Furthermore, the coupon has a sticky backing which is suitable for attachment to the transaction receipt but without the handling problems associated with prior art methods.

Figure 6A:
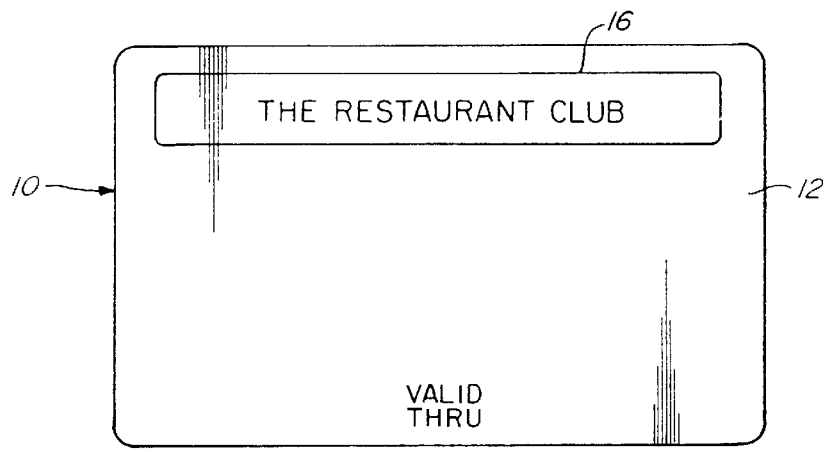
FIG. 6a depicts a first planar side of a redemption card suitable as a redemption vehicle according to another embodiment of this invention.
Figure 6B:
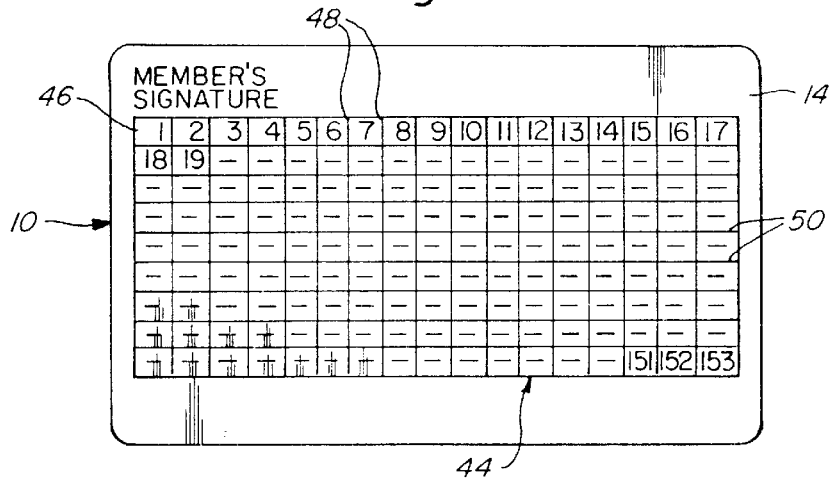
FIG. 6b depicts a second planar side of a redemption card suitable as a redemption vehicle according to another embodiment of this invention.

FIGS. 6a and 6b illustrate, respectively, the first and second major planar sides of a redemption card suitable for use as a redemption vehicle according to another embodiment of the present invention. In FIG. 6a, there is printed on the first planar side 12 of the redemption card 10, an identification field 16 which may be a graphic field, a store name, a company logo, and the like. The depicted identification field is used to identify the offeror of such promotional vehicle. Letters, numbers, and other symbols suitable for identifying the offeror of the card are contemplated by the present invention. In addition, the card may be printed with a static graphic field before a time of printing of the card and label set or may be personalized with the identification field at the time of printing.

FIG. 6b illustrates the second major planar side of the promotional card according to a specific embodiment of the present invention. In FIG. 6b there is attached on the second planar side 14 of the promotional card 10 a multi-segment label assembly 18. The multi-segment label assembly includes a first side printed with a plurality of numbers, letters, coupons and the like which are scored by vertical score lines 48 and horizontal score lines 50 to provide a plurality of removable and reusable segments 46. Although it is depicted that the multi-segment label assembly is attached to the second planar side of the promotional card in FIG. 6b, it is contemplated by the present invention that the promotional card may comprise one or more multi-segment labels affixed to either or both the first and second planar sides of the promotional card 10. In addition, it is contemplated that each segment may be printed with indicia which is identical, different, sequential, non-sequential, and the like.

As discussed above, the prior art method of supplying a similar redemption card with numbers for removal by an offerer of the redemption card, has the problems that a utensil is needed to remove the numbers from the card and for some embodiments, the card is destructed by removing the numbers by punching a hole through the card. Accordingly, it is an advantage of the present invention that the individual segments 46 of the multi-segment label 44 may be removed simply peeling an individual segment 46 from the card without the use of a utensil or without destroying the card. The segment 46 can thereafter simply be thrown away or attached to a receipt document.

Having now described the foregoing embodiments of the invention, it should be clear to those skilled in the art that the foregoing is merely illustrative and not limiting, having been presented by way of example only. Numerous other embodiments are within the scope of one of ordinary skill in the art and are contemplated as falling within the scope of the invention as defined by the claims and equivalents thereto.

What is claimed is:

1. A transaction card control system, comprising:
   a plurality of individuated, non-interconnected transaction cards, wherein each of the transaction cards has
   (a) two opposing sides, at least one side having first indicia thereon, the first indicia allowing for matching of a transaction with an issue of the transaction card, being unique to the transaction card upon which it resides, and distinguishing the transaction card from all other similar transaction cards of the plurality of transaction cards;
   (b) at least one removable and reusable label having two opposing sides, a first side having unique second indicia thereon which corresponds to the first indicia of the card, and a second side affixable to either side of the transaction card.

2. A transaction card control system as in claim 1, further comprising a receiving element for receiving the removable and reusable label upon removal of the label from the transaction card.

3. A transaction card control system as in claim 2, wherein the label, the transaction card, and the receiving element are used as a registration vehicle, and wherein:

the receiving element is a form; and the label is removable from the transaction card and affixable to the form for registration of the transaction card.

4. A transaction card control system as in claim 1, wherein the unique second indicia on the first side of the label comprises an alpha numeric code, a bar code, a letter, a symbol, or a combination of any of the above.

5. A transaction card control system as in claim 1, wherein the second indicia on the first side of the label, and the first indicia on the transaction card, each comprises unique registration indicia which comprises an alpha numeric code, a bar code, a letter, a symbol or a combination of any of the above.

6. A transaction card control system as in claim 1, wherein the label comprises a paper material.

7. A transaction card control system comprising:

a plurality of individuated, non-interconnected transaction cards, wherein each of the transaction cards has
  (a) first indicia, non-removably associated with the card, the first indicia allowing for matching of a transaction with an issue of the transaction card, being unique to the transaction card, and distinguishing the transaction card from all other similar transaction cards of the plurality of transaction cards;
  (b) a second unique, removable indicia associated with the card which corresponds to the first indicia of the card.

8. A transaction card control system as in claim 7, further comprising a receiving element for receiving the removable indicia upon removal of the second, removable indicia from the card.

9. A transaction card control system as in claim 8, wherein the second indicia, the transaction card, and the receiving element are used as a registration vehicle, and wherein:

the receiving element is a form; and the second indicia is removable from the transaction card and affixable to the form for registration of the transaction card.

10. A transaction card control system as in claim 7, wherein the unique second indicia comprises an alpha numeric code, a bar code, a letter, a symbol, or a combination of any of the above.

11. A transaction card control system as in claim 7, wherein the second indicia and the first indicia each comprise unique registration indicia which comprises an alpha numeric code, a bar code, a letter, a symbol, or any combination of the above.

12. A transaction card control system as in claim 7, wherein the label comprises a paper material.

13. A card system comprising:

a plurality of individuated, non-interconnected transaction cards, wherein each of the transaction cards has
  (a) first indicia, non-removably associated with the card, the first indicia allowing for matching of a transaction with an issue of the transaction card, being unique to the transaction card, and distinguishing the transaction card from all other similar transaction cards of the plurality of transaction cards;
  (b) at least one removable and reusable label having two opposing sides, the label having a symbol printed on one of the sides.

14. A card system as in claim 13, wherein the label is a redeemable coupon, the redeemable coupon being selected from the group consisting of a frequent flyer upgrade, a car rental discount, and a hotel upgrade.

15. The system of claim 7, wherein the second unique, removable indicia is removable without leaving any residue on the card.

16. The system of claim 7, wherein the second unique, removable indicia is formed on a single unitary label.

17. The system of claim 7, wherein the second unique, removable indicia comprises a removable and reusable label.

18. A transaction card control system comprising:

a plurality of individuated, non-interconnected transaction cards, wherein each of the transaction cards has
  (a) first indicia, non-removably associated with the card, the first indicia allowing for matching of a transaction with an issue of the transaction card, being unique to the transaction card, and distinguishing the transaction card from all other similar transaction cards of the plurality of transaction cards; and
  (b) a second unique indicia associated with the card which corresponds to the first indicia of the card.

19. A transaction card control system comprising:

a plurality of individuated, non-interconnected transaction cards, wherein each of the transaction cards has
  (a) first indicia, non-removably associated with the card, the first indicia allowing for matching of a transaction with an issue of the transaction card, being unique to the transaction card, and distinguishing the transaction card from all other similar transaction cards of the plurality of transaction cards; and
  (b) a unitary label adhered to the card, the unitary label including second unique indicia which corresponds to the first indicia of the card.

* * * * *